United States Patent
Cho

(10) Patent No.: US 9,357,587 B2
(45) Date of Patent: May 31, 2016

(54) METHOD FOR MANAGING CALLS AND MOBILE TERMINAL USING THE SAME

(71) Applicant: Samsung Electronics Co., Ltd., Gyeonggi-do (KR)

(72) Inventor: Seongho Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 483 days.

(21) Appl. No.: 13/675,262

(22) Filed: Nov. 13, 2012

(65) Prior Publication Data

US 2013/0272178 A1    Oct. 17, 2013

(30) Foreign Application Priority Data

Apr. 12, 2012 (KR) .................... 10-2012-0038083

(51) Int. Cl.
- *H04W 92/18* (2009.01)
- *H04W 76/02* (2009.01)
- *H04W 76/06* (2009.01)

(52) U.S. Cl.
CPC ............ *H04W 92/18* (2013.01); *H04W 76/025* (2013.01); *H04W 76/066* (2013.01)

(58) Field of Classification Search
None
See application file for complete search history.

(56) References Cited

U.S. PATENT DOCUMENTS

| | | | |
|---|---|---|---|
| 8,107,957 B1* | 1/2012 | O'Neil et al. | 455/436 |
| 2004/0203674 A1* | 10/2004 | Shi et al. | 455/415 |
| 2009/0016230 A1 | 1/2009 | Choi | |
| 2009/0163240 A1 | 6/2009 | Ryu et al. | |
| 2011/0032834 A1 | 2/2011 | Kim et al. | |
| 2011/0299471 A1 | 12/2011 | Wang | |
| 2013/0178194 A1* | 7/2013 | Balasubramanian | 455/414.1 |

FOREIGN PATENT DOCUMENTS

WO    2012-005442 A2    1/2012

* cited by examiner

*Primary Examiner* — Ayaz Sheikh
*Assistant Examiner* — Sori Aga
(74) *Attorney, Agent, or Firm* — Cha & Reiter, LLC

(57) ABSTRACT

A call management method, an associated mobile terminal, and a mobile terminal control method using a call status, and a related apparatus. A first status change information is created when a call connection for a first call is requested through a first call application. A second status change information is created when a second call connection for a new call is requested through a second call application on the condition that the first call being pre-established through the first call application is connected. After guide information created using the first status change information and the second status change information is outputted, an input of selection information regarding the guide information is received. At least one of the first and second call applications is a call application that performs a service for a packet switched (PS) call.

15 Claims, 8 Drawing Sheets

METHOD FOR MANAGING CALLS AND MOBILE TERMINAL USING THE SAME

CLAIM OF PRIORITY

This application claims the benefit of priority under 35 U.S.C. §119(a) of a Korean patent application Serial No. 10-2012-0038083 filed on Apr. 12, 2012 in the Korean Intellectual Property Office and assigned, the entire disclosure of which is hereby incorporated by reference in its entirety.

BACKGROUND OF THE INVENTION

1. Field of the Invention

The present invention relates in general to a call management method and apparatus for a mobile terminal. More particularly, the present invention relates to a method of integrated management for circuit switched (CS) calls and packet switched (PS) calls and a mobile terminal using the method.

2. Description of the Related Art

Recent version of mobile terminals, such as smart phones, not only provide CS voice and PS data transmission/reception using 3rd Generation (3G) or 4th Generation (4G) such as Global System for Mobile Communications (GSM), Universal Mobile Telecommunications System (UMTS) or Long Term Evolution (LTE), but also provide IP (Internet Protocol) services based on WLAN (Wireless Local Area Network) technologies such as Wi-Fi represented by IEEE 802.11. Therefore, mobile terminals can provide IP based call services such as 3G PS or WLAN using Voice over IP (VoIP) call applications installed therein as well as circuit switched (CS) based call services.

With related technologies expanded, the different types of call applications for connecting calls are becoming more and more varied. However, currently produced mobile terminals fail to have a module capable of collectively managing various call applications. Therefore, when there arises a conflict between packet switched (PS) calls requested through different call applications, one of them may be unexpectedly disconnected regardless of user's selection or different calls may be simultaneously progressing.

Meanwhile, most of recent mobile terminals such as smart phones may have multi-functionalities that not only offer traditional functions of mobile phones but also by providing various multimedia functions of an MP3 player, an MP4 (i.e., video) player, a voice recorder, and the like. In addition, many kinds of peripheral units may be used to control various functions.

However, there is a problem with some of these peripheral units because they often fail to recognize a call connection made through various call applications. For example, if a user clicks a play button of a multimedia player equipped in an earphone during a call connection, a music file is often played even though a user is still on the phone.

Unfortunately, when a certain call is received by the mobile terminal while another call has been already connected, the absence of any apparatus that allows an integrated management for information about various call applications may lead to no user control for such calls and also cause peripheral units to perform undesirable operation inconsistent with a call scenario.

Thus, there is a need in the art to provide an apparatus and method capable of sharing and managing information about calls connected through respective call applications in order to realize a favorable connection and control of calls through the various types of call applications.

BRIEF SUMMARY OF THE INVENTION

Accordingly, the present invention addresses at least some of the above-mentioned problems and/or disadvantages and offers at least the advantages described below.

An exemplary aspect of the present invention is to provide a call management method and a related mobile terminal satisfy the case of a conflict between at least two calls being active at a mobile terminal including PS calls.

Another exemplary aspect of the present invention is to provide a call management method and a related mobile terminal that shares information about a change in call status with different call applications or apps that are being executed by the mobile terminal.

Still another exemplary aspect of the present invention is to provide a method and apparatus for controlling a mobile terminal by using a call status in order to control a mobile terminal or peripheral unit according to a change in call status.

According to one exemplary aspect of the present invention, a method for managing a call preferably comprises: creating first status change information when a call connection is requested through a first call application; creating second status change information when a new call connection is requested through a second call application on the condition that a call pre-established through the first call application is connected; outputting guide information created using the first status change information and the second status change information; receiving an input of selection information regarding the guide information; and based on the selection information, controlling a connection of the pre-established call and a connection of the new call, wherein at least one of the first and second call applications is a call application that performs a service for a packet switched (PS) call.

According to another exemplary aspect of the present invention, provided is a mobile terminal comprising: a control unit configured to create first status change information when a call connection is requested through a first call application, and to create second status change information when a new call connection is requested through a second call application on the condition that a call pre-established through the first call application is connected; an output unit configured to output guide information created using the first status change information and the second status change information; and an input unit configured to receive an input of selection information regarding the guide information. The control unit is further configured to, based on the selection information, control a connection of the pre-established call and a connection of the new call, and wherein at least one of the first and second call applications is a call application that performs a service for a packet switched (PS) call.

According to yet another exemplary aspect of the present invention, a mobile terminal control method is provided that uses a call status, The method preferably comprises: receiving an input of a control signal for controlling a mobile terminal or a peripheral unit associated with the mobile terminal; creating status change information when the call status is changed; and performing a control process that includes converting the control signal into a call mode signal by using the status change information, and controlling the mobile terminal or the peripheral unit by using the control signal or the call mode signal.

According to still yet another exemplary aspect of the present invention, provided is a mobile terminal control apparatus using a call status, the apparatus preferably comprising: an input unit configured to receive an input of a control signal for controlling a mobile terminal or a peripheral unit associated with the mobile terminal; and a control unit configured to create status change information when the call status is changed, to convert the control signal into a call mode signal by using the status change information, and to control the mobile terminal or the peripheral unit by using the control signal or the call mode signal.

According to the above exemplary aspects of the present invention, in the case of a conflict of at least two calls including PS calls, a user-desired scenario can be satisfied and also call status information may be shared between different call applications.

Additionally, according to the above exemplary aspects of the present invention, it is possible to control a mobile terminal or peripheral unit depending on a change of call status.

Other exemplary aspects, advantages, and salient features of the present invention will become more apparent to those of ordinary skill in the art from the following detailed description, which, taken in conjunction with the annexed drawings, discloses exemplary embodiments of the invention.

DETAILED DESCRIPTION

Exemplary, non-limiting embodiments of the METHOD FOR MANAGING CALLS and MOBILE TERMINAL USING SAME according to the present invention will now be described more fully with reference to the accompanying drawings. The present invention may, however, be embodied in many different forms and should not be construed as limited to the exemplary embodiments set forth herein. Rather, the disclosed embodiments are provided for illustrative purposes only so that this disclosure will be thorough and complete to a person of ordinary skill in the art. The principles and features of this invention may be employed in varied and numerous ways without departing from the scope of the invention.

Although the examples used herein refer to a mobile terminal, a person of ordinary skill in the art understands and appreciates that the scope of the claimed invention is not limited to mobile terminals. Some possible examples of other devices include as portable phone, smart phone, tablet PC, handheld PC, Portable Multimedia Player (PMP), Personal Digital Assistant (PDA), music player (e.g., MP3 player), and portable game terminal, digital broadcasting player, just to name a3 few non-limiting possibilities.

Furthermore, well known or widely used techniques, elements, structures, and processes may not be described or illustrated in detail to avoid obscuring appreciation of the present invention by the person of ordinary skill in the art with discussion of such well-known or widely used techniques, elements, structures, and processes. Although the drawings represent exemplary embodiments of the invention, the drawings are not necessarily to scale and certain features may be exaggerated or omitted in order to better illustrate and explain the present invention.

Now, a mobile terminal according to an exemplary embodiment of the present invention will be described with reference to FIGS. 1 and 2.

Figure 1:
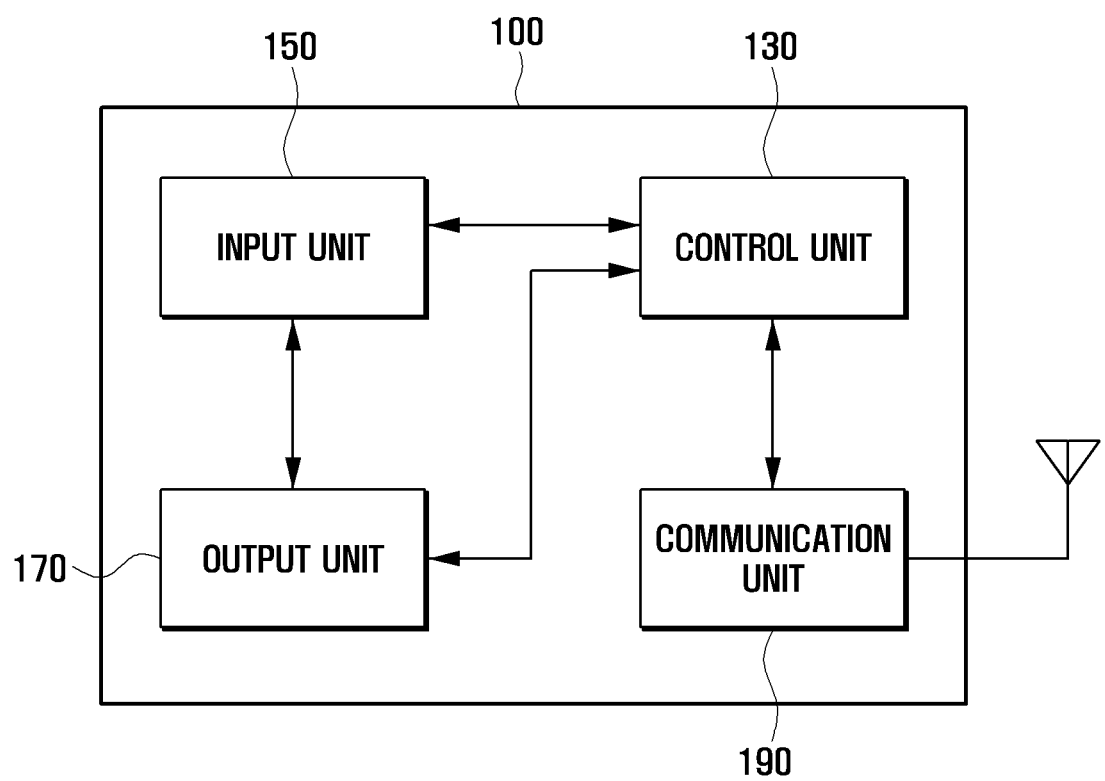
FIG. 1 is a block diagram illustrating a mobile terminal in accordance with an exemplary embodiment of the present invention.
Figure 2:
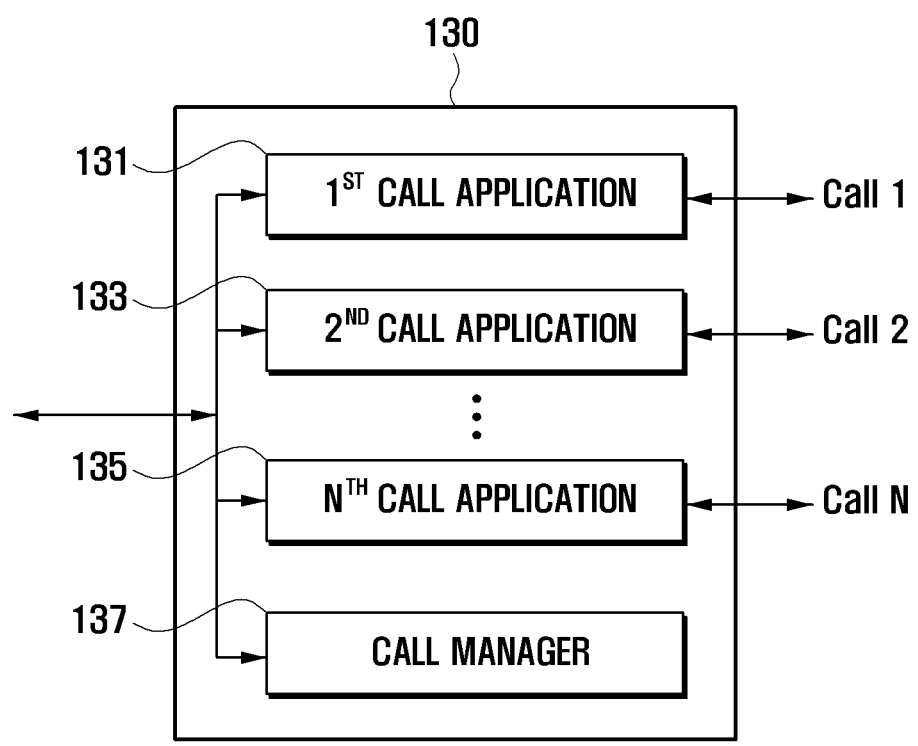
FIG. 2 is a block diagram illustrating in detail a control unit such as shown in FIG. 1 of a mobile terminal in accordance with an exemplary embodiment of the present invention.

FIG. 1 is a block diagram illustrating a mobile terminal in accordance with an exemplary embodiment of the present invention, and FIG. 2 is a block diagram illustrating in detail a control unit of a mobile terminal in accordance with an exemplary embodiment of the present invention.

Referring now to FIG. 1, a mobile terminal 100 according to an embodiment of this invention preferably includes a control unit 130, an input unit 150, and an output unit 170, and may further include a communication unit 190.

The control unit 130, which comprise a processor microprocessor, is configured to create the first status change information when a call connection is requested through a first call application. Also, the control unit 130 creates the second status change information when a new call connection is requested through a second call application on the condition that the first call pre-established through the first call application is connected. The output unit 170 displays guide information created using the first and second status change information. The input unit 150 receives selection information for the guide information. The control unit 130 receives the selection information from the input unit 150 and, based on the received selection information, controls connections of the pre-established call and the new call. Here, at least one of the first and second call applications is a call application which performs a service for PS calls.

Hereinafter, each module will be described in more detail.

When a call connection is requested through the first call application, the control unit 130 creates the first status change information. While a call pre-established through the first call application is connected, and when a new call connection is requested through the second call application, the control unit 130 creates the second status change information.

In this embodiment, a case where a call connection is requested includes a case where a call request is received from any counterpart mobile terminal and a case where a call request is transmitted to any counterpart mobile terminal from the mobile terminal 100 of this invention.

Additionally, status change information preferably includes all kinds of information produced through call applications, such as case where a connection of a new call is requested to a call application, or case where the status of a call application itself is changed. For example, status change information may include at least one of identification information about a call application for connecting a call, display activation status information about a call application, call type information, call status information, and identification information about a counterpart mobile terminal. Also, status change information may further include guide information for an input of selection information.

Specifically, the content of status change information is described as follows.

The identification information about a call application refers to specific information that allows for identifying a call application that connects a call. This identification information may be an ID or name of a call application. The display activation status information about a call application refers to specific information that indicates whether a call application is in a display activated status that permits a user to manipulate, or in a display inactivated status that does not permit a user to manipulate.

For example, if a specific call application is running in a background status (i.e., not displayed on the screen), this call application is regarded as being in a display inactivated status. If such a call application is running in a foreground status (i.e., displayed on the screen), this same specific call application allows a user to manipulate without any change of screen and is regarded as being in a display activated status.

The call type information refers to specific information that indicates the type of a call that is requested. For example, the call type information may include information about whether a call is a voice call or a video call. The call status information refers to specific information about a connection status of a call. For example, the status of a call connected through any call application may be an idle status, an incoming call requesting status, an outgoing call requesting status, a call communicating status, and a call holding status.

The identification information about a counterpart mobile terminal includes all kinds of information that allows the identifying of a counterpart mobile terminal. For example, the identification information about a counterpart mobile terminal may include a phone number or other unique number of a counterpart mobile terminal, or user's name, photo or ID of a counterpart mobile terminal. The control unit 130 may create the identification information about a counterpart mobile terminal by using any information pre-stored in a phonebook of the mobile terminal 100, or by using any information received from a counterpart mobile terminal.

Referring now to FIG. 2, the control unit 130 may preferably include the first application 131, the second application 133, and a call manager 137.

In order to manage calls connected through at least one call application 131, 133 and 135, the call manager 137 may register each call application 131, 133 and 135 therein. When any call application is installed in the mobile terminal, the call manager 137 may recognize and automatically register the installed call application. Alternatively, only a call application that is selected by a user may be manually registered in the call manager 137. This disclosure is based on the assumption that all call applications including the first and second call applications have been already registered in the call manager 137.

When a call connection is requested through the first call application 131, the first call application 131 creates the first status change information. In order that a call is connected and maintained at user's request after a call connection is requested through the first call application 131, the following process of displaying guide information and of inputting selection information may be performed. However, this process is based on the condition that a call already pre-established through the first call application is connected. So, a detailed description regarding a process of establishing a connection requested call and of maintaining the connection will be omitted.

When a connection of a new call is requested through the second call application 133 on the condition that a call pre-established through the first call application 131 is connected, the second application 133 may create the second status change information regarding the new call.

For example, when a request for a video call is received from a caller B through the second call application 133 during a voice call with a caller A through the first call application 131, the second call application 133 creates the second status change information to include information that a call status is changed from the idle status to the incoming call requesting status. In this case, the second status change information may further include a name or ID of the second call application, information indicating the incoming call requesting status, information indicating that a video call is requested, a name of a caller B, a phone number or mobile terminal number of a caller B, or the like.

The call manager 137 may receive the second status change information from the second call application 133 and then delivers the second status change information to at least one call application including the first call application 131. At this time, the call manager 137 may deliver the received second status change information to only a specific call application, which in this case is 1st call application 131 required for a call management, or may deliver the received second status change to all registered "1st through Nth" call applications.

Additionally, if the status of the first call application 131 is in a display-inactivated status at the time the call manager 137 delivers the second status change information, the call manager 137 may switch/change/activate the status of the first call application 131 to a display-activated status.

The call manager 137 delivers the second status change information to the output unit 170 as well as to the registered call applications.

As shown in FIG. 1, the output unit 170 displays guide information based on the first and second status change information created by the control unit 130. The guide information refers to specific information that informs typically via the output unit about a connection requested or connected call or a relevant application in order for a user to select a desired call. Specifically, the guide information is created using information contained in the first and second status change information and may further include additional content requiring an input of selection information associated with the additional content.

Furthermore, the guide information may include parts or the whole of the first and second status change information, and displayed contents may be varied according to user's setting or selection. For example, if there is a new call from Viber during a call through Skype, the guide information may contain identification information (i.e., Skype, Viber) of a currently running call application and of a call application through which a connection of a new call is requested, and may further contain a number of a counterpart mobile terminal and call type information about whether a call is a voice call or a video call.

Also, in addition to the first and second status change information, the output unit 170 may display specific information that requires an input of the selection information, such as "Will you receive call? Yes/No", "Receive/Reject", or "Wait/Receive/Reject on Call". Such information may be additional contents of the guide information that requires an input of the selection information. If the control unit 130 recognizes a specific gesture or voice as the selection information, a related description may be contained in the guide information.

The output unit 170 may include one or more of a display, a speaker, a vibration generator, a light emitting diode (LED), etc. and any other module which can output particular information to a user may be used as the output unit 170. Namely, the guide information may be displayed in the form of text or graphical user interface on the screen, outputted by means of voice through the speaker, or outputted through the vibration generator such as an actuator. An artisan understands and appreciates that the output unit and the input unit may comprise a single touchscreen.

In one exemplary embodiment of the present invention, when the output unit 170 is the speaker, a signal sound corresponding to specific information may be predetermined by a user. The output unit 170 may output the predetermined signal sound during a call so as to inform a user that the status of another call has changed. Also, the output unit 170 may convert the guide information formed of text into voices and then output such voices.

In another exemplary embodiment of the present invention, when the output unit 170 is the vibration generator, the output unit 170 may vary the strength or period of vibration according to the status or type of a call.

In still another embodiment of the present invention, when the output unit 170 comprises an LED, the output unit 170 may vary the brightness of light or change an emitting period according to the guide information so as to display information.

Methods of outputting the guide information by the output unit 170 are not limited to the above-discussed exemplary embodiments, and any other suitable methods or combinations of the above exemplary embodiments may be also used.

With continued reference to FIG. 1, the input unit 150 receives the selection information input by a user with reference to the guide information output by the output unit 170. The selection information indicates which particular call will be connected from among a call connected through the first call application and a call requested through the second call application.

The selection information may be accepting or rejecting information regarding a call requested through the second call application, namely, a new call. Additionally, the selection information may further have information about whether a pre-established call will be terminated or put on hold until the new call is complete.

The input unit 150 may comprise buttons, or virtual buttons, or alternatively or in addition thereto a keyboard of a touch pad. The input unit 150 may recognize user's motion (i.e., actions or gestures) as the selection information by using a sensor such as an acceleration sensor or a gyroscopic sensor. Alternatively or additionally, the input unit 150 may include a microphone. If the microphone is used for receiving an input of the selection information, a specific module that could include a processor configured for analyzing voices inputted as the selection information and then delivering analysis results to the control unit 130 may be further included, or this voice analyzation can be performed at a control unit configured for such operation.

A module configured for the input unit 150 is not limited to the above-discussed exemplary embodiments, and an input of the selection information may be realized through combinations of the above exemplary embodiments.

The selection information received through the input unit 150 is delivered to the control unit 130. Using the selection information, the control unit 130 may control a connection of a call (hereinafter, referred to as 'a pre-established call') which is connected through the first call application 131 and a connection of a call (hereinafter, referred to as 'a new call' or a "subsequent call") which is requested through the second call application 133. The selection information refers to information requesting whether to accept or reject a new call and whether to terminate or place on hold a pre-established call.

The control unit 130 controls a connection of a pre-established call and a connection of a new call, depending on the selection information. If the selection information is rejecting information for the new call, the control unit 130 may terminate the new call and maintain a connection of the pre-established call. If the selection information is accepting information for the new call, the control unit 130 may connect the new call and either place on "hold" or terminate the pre-established call.

In an exemplary embodiment, the call manager 137 of the control unit 130 may perform the above-discussed functions. Namely, the call manager 137 may create a call control command by using the selection information and then deliver the call control command to two or more call applications including the first and second call applications. The call control command refers to a command of controlling the operation of each call application, for example, by controlling the activation of a call application or by controlling a change of a call connection status. Namely, if the selection information indicates acceptance of a new call and the placing on hold of a pre-established call, the call manager 137 may transmit, to the first call application, a call control command of changing the call communicating status to the call holding status, and may also transmit, to the second call application, a call control command of changing the incoming call requesting status to the call communicating status. If the selection information indicates rejection of a new call and maintenance of a pre-established call, the call manager 137 may transmit, to the second call application, a call control command of changing the incoming call requesting status to the idle status.

In another exemplary embodiment, the first or second call application 131 or 133 of the control unit 130 may control a connection of a pre-established call and a connection of a new call. In this case, the call manager 137 performs a function to deliver the status change information created by each respective call application, the selection information required for a call control, the guide information, etc. to each module. A call control such as closing (terminating) a call, maintaining a connection, and holding (placing on hold) a call is performed by the first and second call applications.

Specifically, when the selection information is received by the input unit 150, the first call application 131 receives the selection information and, based on the selection information, may control a connection of a pre-established call. Also, the first call application 131 updates the first status change information by reflecting control results and delivers the updated first status change information to the call manager 137. Then the call manager 137 may deliver the updated first status change information to at least one call application including the second call application 133. Then, by referring to the updated first status change information, the second call application 133 may control a new call connected through the second call application 133.

For example, if the received selection information comprises rejecting information for a new call, the first call application 131 maintains a connection of a call pre-established through the first call application 131 according to the received selection information. Then the first call application 131 delivers, to the call manager 137, the first status change information updated by reflecting control results. The call manager 137 delivers the updated first status change information to at least one call application including the second call application 133, and the second call application 133 may terminate the new call by referring to the updated first status change information. A person of ordinary skill in the art should also appreciate that the second call could be transferred, for example, to voicemail so the caller could leave a message in lieu of termination.

Although in the above exemplary embodiment the first call application delivers, to the call manager 137, the first status change information updated according to the selection information, a module that creates the updated status change information by controlling first a call is not limited to only a call application of a pre-established call. The status of virtually any accessory or peripheral application can be updated as well.

Transmission and reception of data at the time of the above-discussed call connection may be made through the communication unit 190. Although not illustrated in drawings, it is within the spi0rt and scope of the claimed invention that the communication unit 190 may include a circuit communication unit that connects a communication channel with a communication network in a CS manner, and a packet communication unit that connects a data transmission/reception channel with a communication network in a PS manner. A communication network used for a call connection may include 3G/4G mobile communication networks, such as Wibro, WCDMA, GSM, UMTS, and LTE, which support VoIP (Voice over Internet Protocol) and MoIP (Media over Internet Protocol), and may also include any other wired/wireless network such as IP network based on a wireless LAN such as Wi-Fi. This invention is not limited to such specific communication networks, and other formats, as they become available, can be treated as one of the above.

Now, a call management method according to an exemplary embodiment of the present invention will be described with reference to FIGS. 3 to 5.

Figure 3:
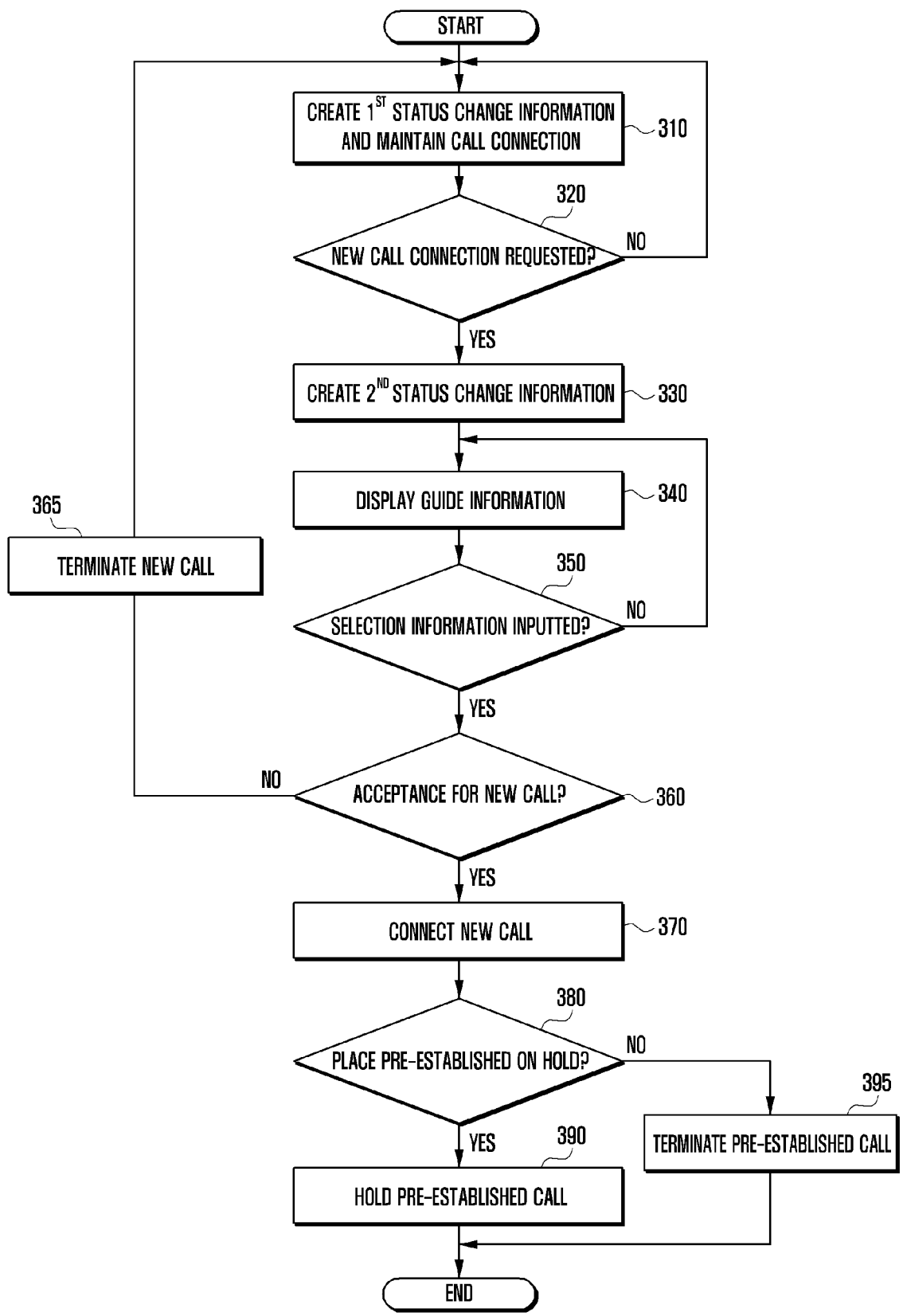
FIG. 3 is a flow diagram illustrating an operational example of a call management method in accordance with an exemplary embodiment of the present invention.

FIG. 3 is a flow diagram illustrating exemplary operation of a call management method in accordance with an exemplary embodiment of the present invention.

Referring now to FIG. 3, at step 310, when a call connection is requested through the first call application, the control unit 130 creates the first status change information and maintains a call (hereinafter, referred to as 'a pre-established call') connected through the first call application. In this step, a request for a call connection may be an incoming call or an outgoing call. At step 320, if a new call connection is requested through the second call application on the condition that a call pre-established through the first call application is connected, then at step 330, the control unit 130 creates the second status change information of the second call application. Here, a request for a connection of a new call includes a request regarding an incoming or outgoing call. The first and second status change information may include at least one of identification information about a call application for connecting a call, display activation status information about a call application, call type information, call status information, and identification information about a counterpart mobile terminal. Also, at least one of the first and second call applications is a call application which performs a service for packet switched (PS) calls.

Next, at step 340, the output unit 170 displays guide information created using the first and second status change information, and then at step 350, the input unit 150 receives an input of selection information regarding the status change information. If there is no input of selection information in the step 350, the status change information may be displayed without change. Then, by using the selection information, the control unit 130 controls connections of a pre-established call and of a new call, with a mobile terminal, in steps 360 to 395.

More specifically, at step 360, the control unit 130 determines whether the selection information is accepting information regarding a new call. If there is an acceptance of a new call, then at step 370 the control unit 130 connects the new call.

However, if at step 360, the selection information is rejecting information regarding a new call, at step 365 the control unit 130 terminates the new call and returns to the previous step 310 to maintain the pre-established call. When at step 370 a new call is connected, the control unit 130 at step 380 determines whether the selection information contains indication placed the pre-established call on hold. If so, then at step 390 the control unit 130 holds a pre-established call. If the selection information contains indication to terminate a pre-established call as the result of determination in the step 380, the control unit 130 terminates the pre-established call (step 395).

Figure 4:
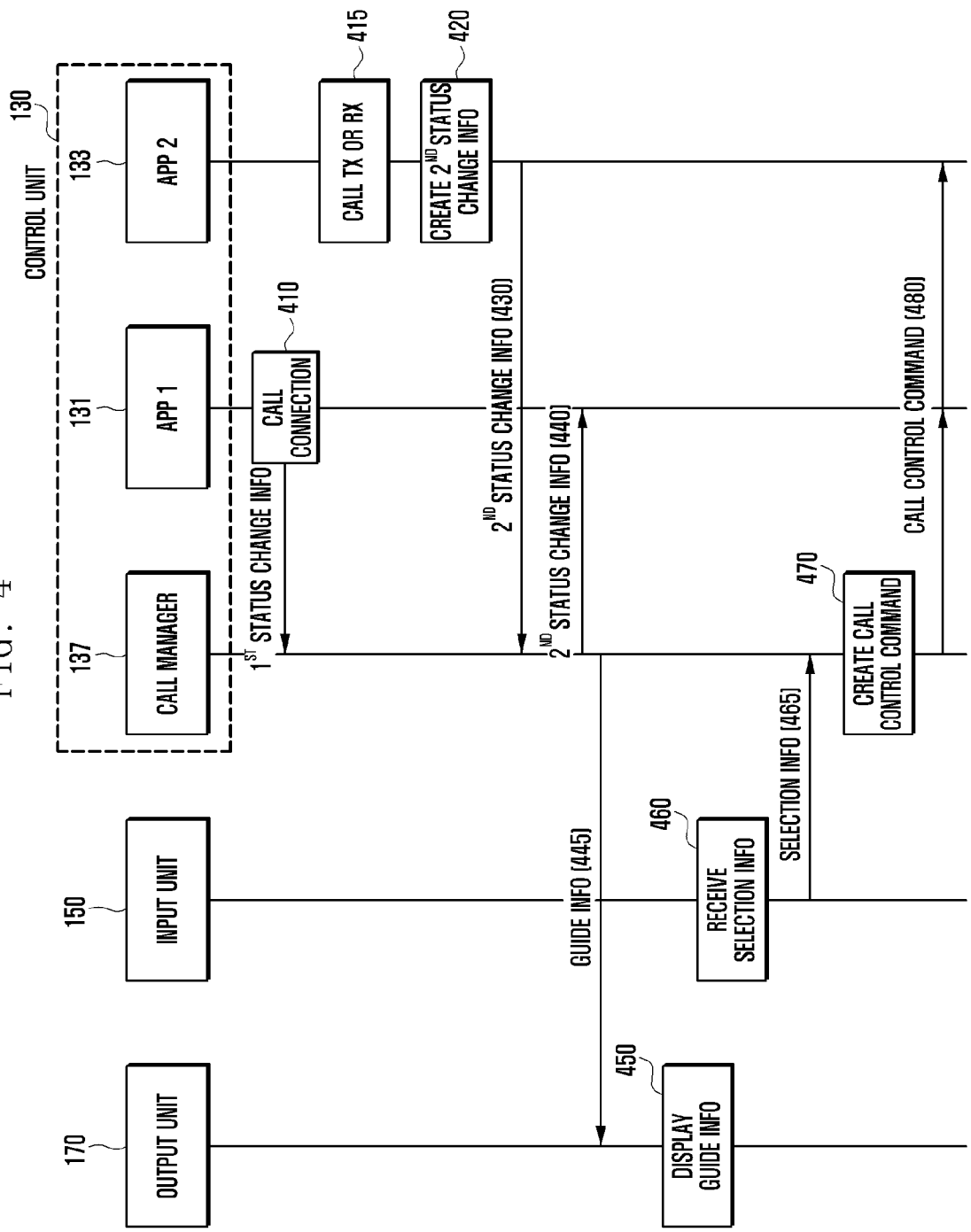
FIGS. 4 and 5 are flow diagrams illustrating in detail an operational example of a call management method in accordance with an exemplary embodiment of the present invention.
Figure 5:
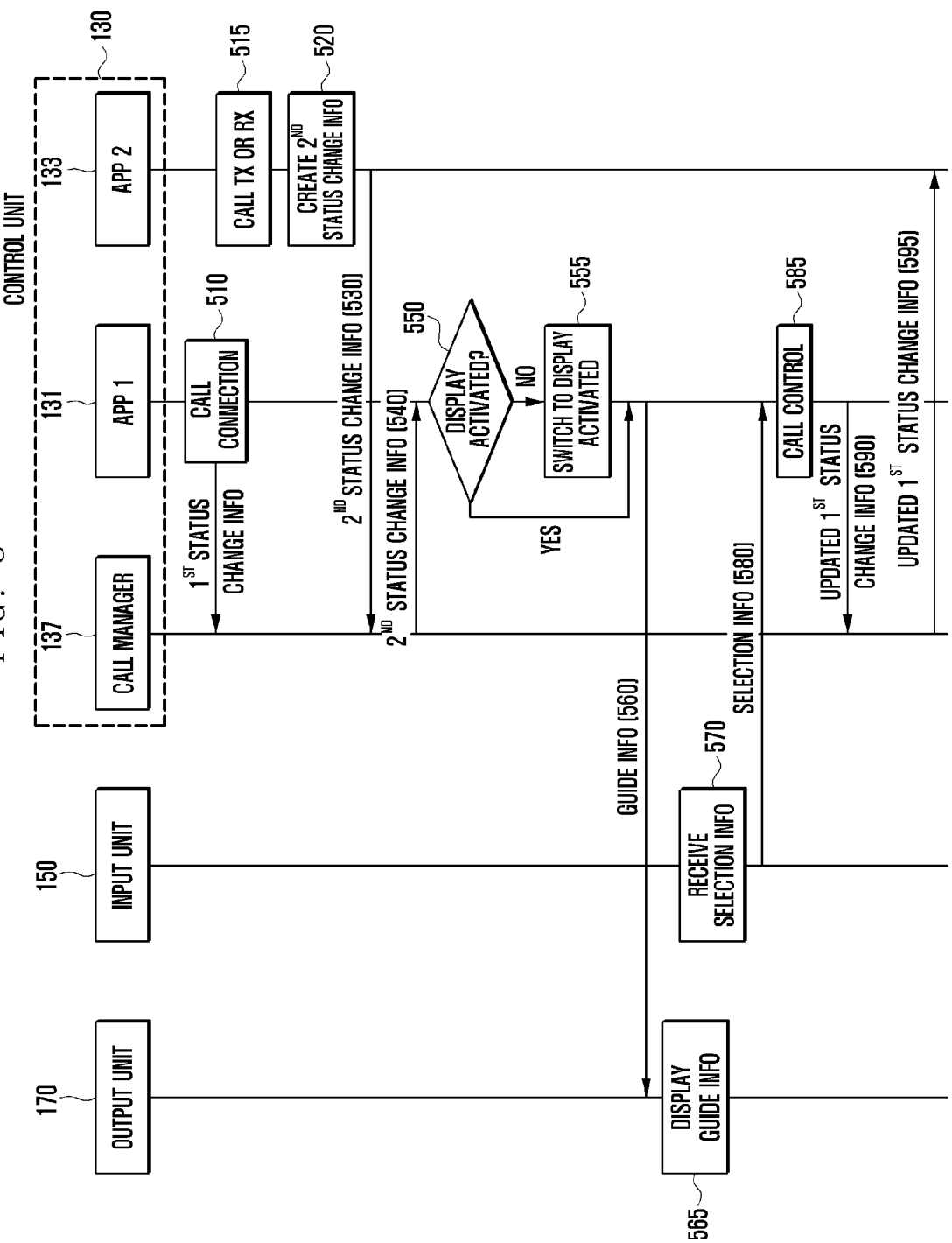

FIGS. 4 and 5 are flow diagrams illustrating in detail a call management method in accordance with an exemplary embodiment of the present invention.

Referring now to FIG. 4, at step 410, when a call connection is requested through the first call application 131, the first call application 131 creates the first status change information, delivers it to the call manager 137, and maintains a connection of a pre-established call. Although not illustrated in drawings, the first call application 131 creates the updated first status change information and delivers it to the call manager 137 whenever the status of a pre-established call is changed, and then the call manager 137 may deliver the updated first status change information to registered call applications. At step 415, if a call transmission or reception is made through the second call application 133 on the condition that a pre-established call is still connected, then at step 420 the second call application 133 creates the second status change information. Next, at step 430, the call manager 137 receives the second status change information from the second call application 133 and at step 440 then delivers the second status change information to the first call application 131. Although not illustrated, if two or more call applications are used, the call manager 137 may deliver the received second status change information to any other registered call applications, for example, the "N" call application shown in FIG. 1.

With continued reference to FIG. 4, next, at step 445 the call manager 137 delivers, to the output unit 170, guide information created using the first and second status change information, and at step 450 the output unit 170 outputs the guide information. The guide information may be outputted through a display screen, a speaker, a vibration generator, an LED, etc. without being limited to specific output manner. Based on the guide information, at step 460 the input unit 150 receives an input of selection information. In this step, the selection information may be inputted using soft buttons, voices, actions, or gestures, depending on the guide information. The inputted selection information is delivered to the call manager 137 (step 465), and then at step 470 the call manager 137 creates a call control command based on the selection information. Also, at step 480 the call manager 137 delivers the call control command to the first and second call applications. Alternatively, in order to inform a call change status, the call manager 137 may deliver the call control command to two or more any other call applications including the first and second call applications.

Although not illustrated, if the selection information indicates acceptance of a call received or transmitted through the second call application 133, the call manager 137 delivers, to the second call application, a call control command of changing an incoming call requesting status to a call communicating status. At the same time, the call manager 137 delivers, to the first call application 131, a call control command of holding or closing a pre-established call. If the selection information indicates rejection of a call received or transmitted through the second call application 133, the call manager 137 delivers, to the first call application 131, a call control command of maintaining a pre-established call. Also, the call manager 137 may deliver to the second call application 133, a call control command of changing an incoming call requesting status to an idle status. It is also possible that the second call is forwarded to voicemail (or to a predetermined different telephone number) and the output unit could display the changed status while the pre-established call is maintained.

Referring now to FIG. 5, at step 510, when a call connection is requested through the first call application 131, the first call application 131 creates the first status change information, delivers it to the call manager 137, and maintains a connection of a pre-established call. Although not illustrated in drawings, the first call application 131 creates the updated first status change information and delivers the status change information to the call manager 137 whenever the status of a pre-established call is changed, and then the call manager 137 may deliver the updated first status change information to registered call applications. While a pre-established call is connected through the first call application 131, and when a call transmission or reception is made through the second call application 133 at step 515, then at step 520 the second call application 133 creates the second status change information. At step 530, the call manager 137 receives the second status change information from the second call application 133 and at step 540 then delivers the second status change information to the first call application 131. Although not illustrated, if two or more call applications are used, the call manager 137 may deliver the received second status change information to any other registered call applications.

If at step 550 the first call application 131 that maintains a pre-established call is in a display inactivated status when receiving the second status change information from the call manager 137, then at step 555 first call application 131 may be switched from a display inactivated status to a display activated status.

The first call application 131 may be set to be switched to a display activated status when receiving the status change information, or alternatively the call manager 137 may insert a switch command for switching the status of the first call application 131 into the status change information to be delivered. The first call application 131 switched in a display activated status creates guide information, using both the first status change information created therein and the second status change information received from the call manager 137, and then at step 560 delivers the created guide information to the output unit 170.

With continued reference to FIG. 5, at step 565, the output unit 170 outputs the guide information. The guide information may be outputted in the form of text, image, voice, vibration, light, etc. through a display screen, a speaker, a vibration generator, an LED, etc. without being limited to specific output manner. Based on the guide information, at step 570 the input unit 150 receives an input of selection information. In this step, the selection information may be inputted using soft buttons, voices, actions, or gestures without being limited to specific input manner. At step 580, the inputted selection information is delivered to the first call application 131. Then the first call application 131 controls a call by using the selection information (step 585) and, based on control results, updates the first status change information. Next, at step 590 the first call application 131 delivers the updated first status change information to the call manager 137. For example, if the selection information indicates acceptance of a call newly requested through the second call application and also indicates terminate of a pre-established call maintained through the first call application, the first call application may terminate a call, update the call status information by reflecting a termination of a call, and deliver the updated first status change information to the call manager 137. The call manager 137 that receives the updated first status change information at step 595 delivers the status change information to at least one call application including the second call application. Then the second call application may control a connection of a new call, depending on the updated first status change information. As discussed above, the updated first status change information may have the content of selection information as well as call status information of the first call application. Therefore, the second call application may connect a new call by referring to accepting information regarding a new call.

As discussed above, since each application creates the status change information and delivers it to the call manager 137 when the status of a call application is changed, the call manager 137 can collectively manage and share registered call applications. Additionally, since the call manager 137 delivers the status change information to each call application, there arises no confliction between calls connected through different call applications.

According to the present invention, the mobile terminal allows an integrated management of received or transmitted calls regardless of types of call applications, and renders it is possible to control calls according to a user-desired scenario.

Figure 6:
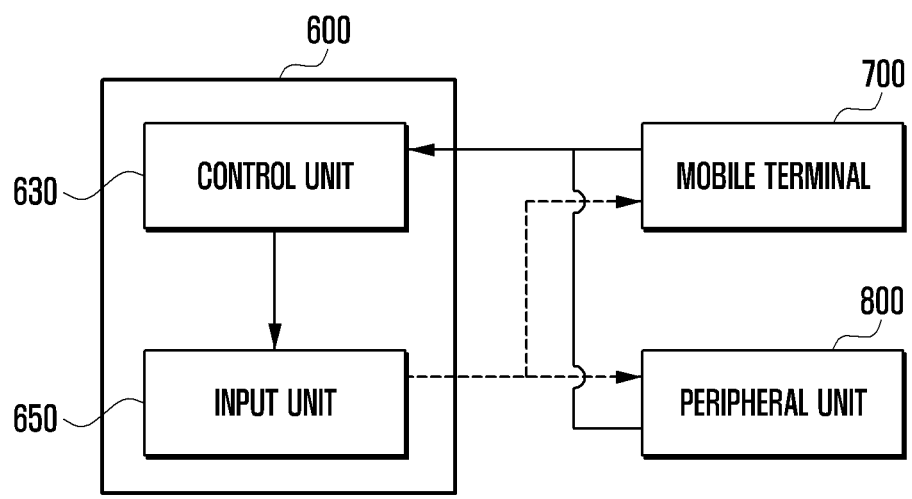
FIG. 6 is a block diagram illustrating a mobile terminal control apparatus in accordance with an exemplary embodiment of the present invention.

FIG. 6 is a block diagram illustrating a mobile terminal control apparatus in accordance with an exemplary embodiment of the present invention.

Referring now to FIG. 6, the mobile terminal control apparatus 600 according to an exemplary embodiment of this invention may include an input unit 630 and a control unit 650.

The input unit 630 receives an input of control signals for controlling mobile terminals or peripheral units. A control signal for controlling a mobile terminal is inputted through a mobile terminal 700, which includes a volume regulating button, a play button for a multimedia playback module embedded in the mobile terminal, a camera control button, a speaker for receiving an input of voice control signals, a proximity sensor for sensing a distance from a user, and the like. A control signal for controlling a peripheral unit associated with the mobile terminal is inputted through a peripheral unit 800, which includes but is in no way limited to a Bluetooth device, an earphone, an independent volume regulator separated from the mobile terminal, and the like.

The control unit 650 creates status change information in response to a change of a call status, converts a control signal into a call mode signal by using the status change information, and controls the mobile terminal or the peripheral unit by using a control signal or a call mode signal. The status change information may include at least one of identification information about a call application, display activation status information about a call application, call type information, call status information, and identification information about a counterpart mobile terminal.

In an exemplary embodiment of the present invention, when the status of the mobile terminal is changed from an idle status to at least one of: an incoming call requesting status, an outgoing call requesting status, a call communicating status, and a call holding status, the control unit 650 creates the status change information and, uses the status change information to converts a control signal inputted through the mobile terminal 700 or the peripheral unit 800 into a call mode signal. This call mode signal means a signal used during a call, for example, a call accept/terminate signal or a call received sound volume up/down signal.

Specifically, the control unit 650 receives a control signal, such as a click, a double click, a long press, a play, a pause, or a volume up/down, inputted through the mobile terminal 700 or the peripheral unit 800, and then converts the received control signal into a call mode signal such as a call accept/terminate signal or a call received sound volume up/down signal.

Also, the control unit 650 may set a call mode signal to an empty signal (for example, signal without any data that would be used for a change) that causes no action. For example, if a call mode signal corresponding to a play signal which is one of control signals is set to an empty signal, the mobile terminal or the peripheral unit does not operate even though a user enters a play button during a call. In another example, if a proximity sensor determines that a user is in close proximity to the mobile terminal, and also when a call progresses, the control unit 650 may set all signals inputted through soft keys on the screen to constitute empty signals. Namely, signals only inputted on the screen causes no action. If the status of the mobile terminal is changed from one of an incoming call requesting status, an outgoing call requesting status, a call communicating status, and a call holding status to an idle status, the control unit 650 may deliver an inputted control signal, as it is, to the mobile terminal 700 and the peripheral unit 800. Therefore, in an idle status, the mobile terminal and the peripheral unit operate according to an original control signal.

Figure 7:
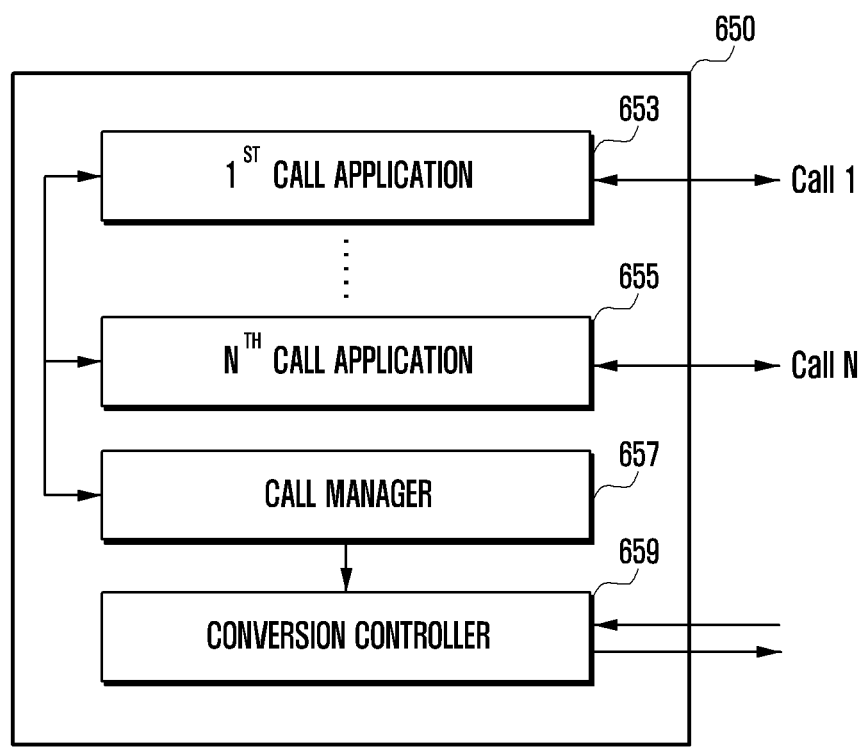
FIG. 7 is a block diagram illustrating in detail a control unit of a mobile terminal control apparatus in accordance with an exemplary embodiment of the present invention.

FIG. 7 is a block diagram illustrating in detail a control unit of a mobile terminal control apparatus in accordance with an exemplary embodiment of the present invention. Referring now to FIG. 7, the control unit 650 may include at least one call application 653 and 655, a call manager 657, and a conversion controller 659.

The call application 653 and 655 may create the status change information when a call status is changed. Details of the status change information are the same as earlier discussed in FIG. 1.

The call manager 657 analyzes the status change information received from the call application. The call manager 657 may extract, from information contained in the status change information, specific information required for controlling the mobile terminal and the peripheral unit. For example, if call status information only is used for a control of the mobile terminal and the peripheral unit, the call manager 657 may extract only the call status information from the status change information.

If the mobile terminal is in a call-alive status as the result of analysis by the call manager 657, the conversion controller 659 converts a control signal into a call mode signal and then, based on the call mode signal, controls the mobile terminal and the peripheral unit. Here, the call-alive status includes an incoming call requesting status, an outgoing call requesting status, and a call holding status as well as a call communicating status.

If the mobile terminal is in an idle status as the result of analysis by the call manager 657, the conversion controller 659 may control the mobile terminal and the peripheral unit by using the control signal.

Namely, any signal inputted through the mobile terminal 700 or the peripheral unit 800 is used to control the mobile terminal or the peripheral unit by being converted through the control unit 650.

The above-discussed modules are separated from each other for the convenience of description, and may be unified together in actual realization in part or whole.

Figure 8:
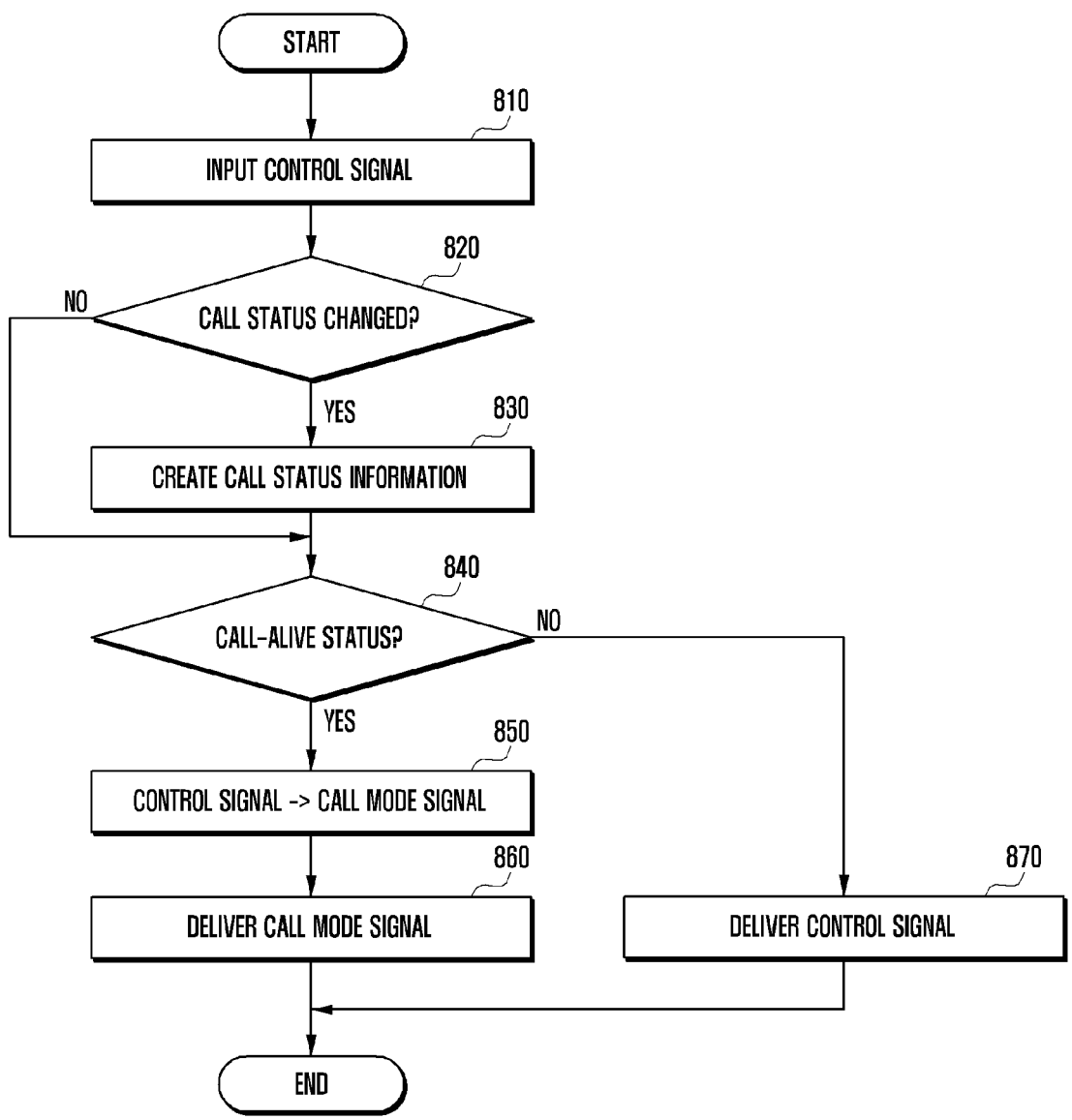
FIG. 8 is a flow diagram illustrating a mobile terminal control method in accordance with an exemplary embodiment of the present invention.

FIG. 8 is a flow diagram illustrating a mobile terminal control method in accordance with an exemplary embodiment of the present invention.

Referring to FIG. 8, at step 810 the control unit 650 receives an input of a control signal. If at step 820 a call status is changed, then at step 830 the control unit 650 creates status change information. Thereafter, at step (840) based on the status change information, the control unit 650 analyzes whether the mobile terminal is in a call-alive status. If there is no change of a call status in the step 820 even though a control signal is inputted in the step 810, the control unit 650 performs step 840 based on an earlier created status change information.

If the mobile terminal is in a call-alive status (i.e., a call communicating status, an incoming or outgoing call requesting status, or a call holding status) as the result of analyzing the status change information by the control unit 650, then at step 850 the control unit 650 converts a control signal into a call mode signal. Then at step 860 the control unit 650 delivers the call mode signal to the mobile terminal or the peripheral unit. If the mobile terminal is in an idle status as the result of analysis, at step 870 the control unit 650 delivers the inputted control signal to the mobile terminal or the peripheral unit as it is (namely, without conversion).

As discussed above, since the mobile terminal control apparatus performs a control signal processing according to a call connection status of the mobile terminal, the mobile terminal may suitably operate depending on the status of a call.

The above-described methods according to the present invention can be implemented in hardware, firmware or as software or computer code loaded into hardware such as a processor or microprocessor and executed, the machine executable code being stored on a recording medium such as a CD ROM, an RAM, a floppy disk, a hard disk, or a magneto-optical disk or computer code downloaded over a network originally stored on a remote recording medium or a non-transitory machine readable medium and to be stored on a local recording non-transitory medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, thumbnail, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method in a mobile terminal, the method comprising:
   registering, by a call manager of the mobile terminal, a first call application and a second call application installed to the mobile terminal, the second call application different than the first call application and both configured to execute packet switched (PS) calls;

in response to receiving a first call connection request for the registered first call application, generating a first status change information by the first call application to notify the call manager of a first call connection via the first call application;

in response receiving a second call connection request for the registered second call application while the first call connection is active, generating a second status change information by the second call application notifying the call manager of the second call connection request;

displaying, by a display of the mobile terminal, guide information requesting selection of one of the first call connection and a second call connection corresponding to the second call connection request; and in response to receiving the requested selection, executing by at least one processor one of the first call connection and the second call connection.

2. The method of claim 1, wherein the first status change information and the second status change information each includes at least one of:

identification information for the first call application or second call application, display activation status information for the first call application or second call application, call type information for the first call application or second call application, call status information for the first call application or second call application, and identification information about a counterpart mobile terminal.

3. The method of claim 1, wherein the requested selection comprises a detected input via soft buttons, voice commands, detected actions, and gesture commands, according to the displayed guide information.

4. The method of claim 1, further comprising:

transmitting the generated second status change information to the first call application, wherein the executing of one of the first call connection and the second call connection further includes:

generating a call control command using the requested selection; and transmitting the generated call control command to the first call application and the second call application.

5. The method of claim 4, further comprising:

registering by the call manager a plurality of call applications installed to the mobile terminal, including the first call application and the second application, wherein the second status change information is delivered to additional call applications of the plurality of call applications including the first call application, and wherein the call control command is transmitted to at least two call applications of the plurality of call applications.

6. The method of claim 1, further comprising:

transmitting the generated second status change information to at least the first call application, wherein executing one of the first call and the second call further includes:

executing the first call by the first call application according to the requested selection;

updating, by the first call application, the first status change information to indicate the executing of the first call; and transmitting the updated first status change information to at least the second call application.

7. The method of claim 4, further comprising:

if the first call application is in a deactivated display status when the second status change information is transmitted, switching the first call application from the deactivated display status to an activated display status.

8. The method of claim 1, wherein executing one of the first call and the second call further includes:

when the requested selection indicates rejection of the second call connection request, terminating the second call and maintaining execution of the first call connection; and when the requested selection indicates acceptance of the second call, connection request, executing the second call connection and either placing the first call connection on hold or terminating the first call connection.

9. The method of claim 8, wherein when the requested selection indicates rejection of the second call connection, forwarding the second call connection to voice mail or to a predetermined phone number.

10. A mobile terminal comprising:

a memory;

a communication unit to communicate with an external terminal;

a display; and at least one processor coupled to the memory configured to:

register to the memory, by a call manager of the mobile terminal, a first call application and a second call application installed to the memory, the second call application different than the first call application and both configured to execute packet switched (PS) calls via the communication unit, in response to receiving a first call connection request via the communication unit for the registered first call application, generating, by the first call application, a first status change information notifying the call manager of a first call connection via the first call application;

in response receiving a second call connection request for the registered second call application while the first call connection is active, generating, by the second call application, a second status change information notifying the call manager of the second call connection request;

control the display to display guide information requesting selection of one of the first call connection and a second call connection corresponding to the second call connection request; and in response to receiving the requested selection, execute one of the first call connection and the second call connection indicated by the selection.

11. The mobile terminal of claim 10, wherein the first status change information and the second status change information each includes at least one of:

identification information for the first call application or second call application, display activation status information for the first call application or second respective call application, call type information for the first call application or second respective call application, call status information for the first call application or second respective call application, and identification information about a counterpart mobile terminal.

12. The mobile terminal of claim 10, wherein:
the first call application generates the first status change information when the first call connection request is received, and to maintains the first call connection;
the second call application generates the second status change information when the second call connection requested is received; and
the call manager receives the first status change information from the first call application, receives the second status change information from the second call application, and delivers the second status change information to at least the first call application,
wherein the call manager is further generates a call control command by using the requested selection, and transmits the call control command to both the first call application and the second call application.

13. The mobile terminal of claim 12, wherein:
the first call application executes the first call connection according to the requested selection, to update the first status change information to reflect execution of the first call connection, and transmit the updated first status change information to the call manager, and
wherein the call manager receives the updated first status change information, and transmits the updated first status change information to at least the second call application.

14. The mobile terminal of claim 12, wherein, the at least one processor is further configured to:
if the first call application is in a deactivated display status when the second status change information is delivered, switch, by the call manager, the status of the first call application from the deactivated display status to an activated display status.

15. The mobile terminal of claim 10, wherein the at least one processor is further configured to:
terminate the second call connection and maintain the first call connection when the requested selection indicates rejection of the second call connection request, and
execute the second call connection and place the first call connection on hold or terminate the first call connection when the requested selection indicates acceptance of the second call connection request.

* * * * *

UNITED STATES PATENT AND TRADEMARK OFFICE
CERTIFICATE OF CORRECTION

PATENT NO.         : 9,357,587 B2
APPLICATION NO.    : 13/675262
DATED              : May 31, 2016
INVENTOR(S)        : Seongho Cho It is certified that error appears in the above-identified patent and that said Letters Patent is hereby corrected as shown below:

In the Claims

Column 17, Claim 12, Line 4 should read as follows:
--...and maintains the first...--

Column 17, Claim 12, Line 13 should read as follows:
--...manager further generates a...--

Signed and Sealed this
Twelfth Day of July, 2016

Michelle K. Lee
*Director of the United States Patent and Trademark Office*